US011859734B2

(12) United States Patent
Kauffmann (10) Patent No.: US 11,859,734 B2
(45) Date of Patent: Jan. 2, 2024

(54) VALVE FOR MICROFLUIDIC DEVICE (71) Applicant: Siemens Healthcare Diagnostics Inc., Tarrytown, NY (US)

(72) Inventor: Aaron Kauffmann, Elkhart, IN (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 18/252,842

(22) PCT Filed: Nov. 12, 2021

(86) PCT No.: PCT/US2021/072369
§ 371 (c)(1),
(2) Date: May 12, 2023

(87) PCT Pub. No.: WO2022/104365
PCT Pub. Date: May 19, 2022

(65) Prior Publication Data
US 2023/0383865 A1 Nov. 30, 2023

Related U.S. Application Data (60) Provisional application No. 63/114,083, filed on Nov. 16, 2020.

(51) Int. Cl.
*F16K 99/00* (2006.01)
(52) U.S. Cl.
CPC ...... *F16K 99/0015* (2013.01); *F16K 99/0059* (2013.01)
(58) Field of Classification Search
CPC ............. F16K 99/0015; F16K 99/0059; B01L 3/5027; B01L 3/502738; B01L 3/502707
See application file for complete search history.

(56) References Cited

U.S. PATENT DOCUMENTS 6,066,448 A    5/2000  Wohlstadter et al.
7,781,226 B2   8/2010  McDevitt et al.
(Continued)

FOREIGN PATENT DOCUMENTS

EP    3218108 A2   9/2017
EP    3482189 A1   5/2019
(Continued)

OTHER PUBLICATIONS

International Search Report and Written Opinion of International Application No. PCT/US2021/072369 dated Feb. 7, 2022.
Al-Faqheri et al. "Vacuum/Compression Valving (VCV) Using Parrafin-Wax on a Centrifugal Microfluidic CD Platform", Mar. 11, 2013, PLoS One, vol. 83, Issue 3, e58523, pp. 1-9.
Smith et al., "CD-Based Microfluidics for Primary Care in Extreme Point-of-Care Settings", Jan. 29, 2016, MDPI Micromachines, vol. 7, Issue 22, pp. 1-32.
(Continued)

*Primary Examiner* — Brian J. Sines (57) ABSTRACT

A microfluidic device has a first substrate, a resilient diaphragm, an actuator, and a second substrate. The first substrate has an opening extending therethrough. The resilient diaphragm is secured to a second side and surrounds the opening. The actuator is secured to a first side and surrounds the opening. The first substrate, the resilient diaphragm, and the actuator cooperate to form a gas-tight chamber. The second substrate has a channel formed therein having a first end and a second end. The second substrate is secured to the first substrate. A volume of gas disposed in the gas-tight chamber pressurizes the gas-tight chamber and expands the resilient diaphragm such that the resilient diaphragm is disposed in the channel between the first end and the second end. The resilient diaphragm retracts from the channel to open the channel from the first end and the second end when the gas-tight chamber is depressurized.

26 Claims, 8 Drawing Sheets

(56) References Cited

U.S. PATENT DOCUMENTS

| | | |
|---|---|---|
| 8,216,832 B2 | 7/2012 | Battrell et al. |
| 8,646,482 B2 | 2/2014 | Zhou et al. |
| 9,371,937 B2* | 6/2016 | Nachef ............... F16K 99/0015 |
| 9,597,685 B2 | 3/2017 | Johnson et al. |
| 9,957,553 B2 | 5/2018 | Kayyem et al. |
| 2002/0166585 A1 | 11/2002 | O'Connor et al. |
| 2004/0209354 A1 | 10/2004 | Mathies et al. |
| 2007/0009391 A1 | 1/2007 | Bedingham et al. |
| 2011/0061526 A1 | 3/2011 | Wackerle et al. |
| 2011/0212453 A1 | 9/2011 | Agarwal et al. |
| 2012/0107811 A1 | 5/2012 | Kelso et al. |
| 2013/0139895 A1* | 6/2013 | Vangbo ............. B01L 3/502738 137/15.01 |
| 2014/0352819 A1* | 12/2014 | Pugliese ............. F16K 99/0015 251/65 |
| 2016/0038942 A1 | 2/2016 | Roberts |
| 2016/0220997 A1* | 8/2016 | Mescher ........... B01L 3/502738 |
| 2017/0327867 A1 | 11/2017 | Dohale et al. |
| 2018/0161772 A1 | 6/2018 | Rammohan et al. |
| 2019/0091686 A1 | 3/2019 | Kellogg et al. |
| 2019/0094114 A1 | 3/2019 | Myers, III et al. |
| 2019/0232282 A1 | 8/2019 | Pierson et al. |
| 2019/0299206 A1 | 10/2019 | Moura Pires De Andrade Tenreiro et al. |
| 2020/0001292 A1 | 1/2020 | Sabourin et al. |

FOREIGN PATENT DOCUMENTS

| | | |
|---|---|---|
| WO | 2007057744 A2 | 5/2007 |
| WO | 2010141326 A1 | 12/2010 |
| WO | 2015150742 A1 | 10/2015 |
| WO | 2019219844 A1 | 11/2019 |

OTHER PUBLICATIONS

Aeinehvand, "Reversible Microballoon System for Handling Bioanalytical Assays on Centrifugal Microfluidic Platform", 2016, Thesis for Faculty of Engineering—University of Malaya Kuala Lumpur, pp. 1-135.

Kazemzadeh et al., "A Micro-Dispenser for Long-Term Storage and Controlled Release of Liquids", 2019, Nature Communications, 10:189, pp. 1-11.

Strohmeier et al., "Centrifugal Microfluidic Platforms: Advanced Unit Operations and Applications", 2015, The Royal Society of Chemistry, Chem. Soc. Rev., 44, pp. 6187-6229.

Clime et al. "Active Pumping and Control of Flows in Centrifugal Microfluidics", 2019, Microfluidics and Nanofluidics, 23:29, pp. 1-22.

Hess et al. "Review on Pneumatic Operations in Centrifugal Microfluidics", Nov. 21, 2019, Lab Chip, 19, pp. 3745-3770.

* cited by examiner

VALVE FOR MICROFLUIDIC DEVICE

This application claims benefit under 35 USC § 119(e) of U.S. Provisional Application No. 63/114,083, filed Nov. 16, 2020. The entire contents of the above-referenced patent application(s) are hereby expressly incorporated herein by reference.

BACKGROUND

An assay is an investigative procedure commonly used in hospital and laboratory settings to qualitatively assess or quantitively measure the presences, amount, or functional activity of an analyte in a sample. For example, hospitals may conduct an assay to analyze small samples of fluids, such as blood, serum, plasma, or other bodily fluids to detect clinically significant analytes.

Some assays, such as ELISA assays, require multiple reagents, rinsing, and incubation steps. Microfluidic devices can integrate several elements that enable an assay to be performed in an automated system. To selectively control the flow of fluids used to perform the assays requires valves to be incorporated into the microfluidic device. The valves used in microfluidic devices generally have a complex structure leading to increased manufacturing costs and increased rates of valve failure.

A need exists for a valve for a microfluidic device of reduced complexity, which thereby reduces manufacturing costs and failure rates of the valve. It is to such a valve and method of making same that the inventive concepts disclosed and claimed herein are directed.

SUMMARY OF THE INVENTIVE CONCEPTS

The inventive concepts disclosed and claimed herein generally relate to a microfluidic device capable of controlling fluid communication utilizing a resilient diaphragm actuated valve. The microfluidic device includes a first substrate, a resilient diaphragm, an actuator, and at least a second substrate. The first substrate has a first side, a second side opposite the first side, and an opening extending from the first side to the second side. The resilient diaphragm is secured to the second side of the first substrate and surrounds the opening of the first substrate. The actuator is secured to the first side of the first substrate and surrounds the opening of the first substrate. The first substrate, the resilient diaphragm, and the actuator cooperate to form a gas-tight chamber. The second substrate has a first side, a second side opposite the first side, and a channel formed in the second side. The channel has a first end and a second end. The second substrate is secured to the first substrate so that the second side of the first substrate and the second side of the second substrate are in face-to-face contact. A volume of gas is disposable in the gas-tight chamber to pressurize the gas-tight chamber and expand the resilient diaphragm such that the resilient diaphragm is disposed in the channel between the first end and the second end. The resilient diaphragm is retractable from the channel to open the channel from the first end and the second when the gas-tight chamber is depressurized.

BRIEF DESCRIPTION OF THE DRAWINGS

To assist those of ordinary skill in the relevant art in making and using the inventive concepts disclosed herein, reference is made to the appended drawings and schematics, which are not intended to be drawn to scale, and in which like reference numerals are intended to refer to the same or similar elements for consistency. For purposes of clarity, not every component may be labeled in every drawing. Certain features and certain views of the figures may be shown exaggerated and not to scale or in schematic in the interest of clarity and conciseness. In the drawings.

DETAILED DESCRIPTION OF EXEMPLARY EMBODIMENTS

Before explaining at least one embodiment of the inventive concept(s) in detail by way of exemplary drawings, experimentation, results, and laboratory procedures, it is to be understood that the inventive concept(s) is not limited in its application to the details of construction and the arrangement of the components set forth in the following description or illustrated in the drawings, experimentation and/or results. The inventive concept(s) is capable of other embodiments or of being practiced or carried out in various ways. The language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined, scientific and technical terms used in connection with the presently disclosed and claimed inventive concept(s) shall have the meanings commonly understood by those of ordinary skill in the art. Further, unless otherwise required by context, singular terms shall include pluralities and plural terms shall include the singular. The foregoing techniques and procedures are generally performed according to conventional methods well known in the art and as described in various general and more specific references cited and discussed throughout the present specification. The nomenclatures utilized in connection with, and the laboratory procedures and techniques of, analytical chemistry, synthetic organic chemistry, and medicinal and pharmaceutical chemistry described herein are those well-known and commonly used in the art. Standard techniques are used for chemical syntheses and chemical analyses.

All the articles, compositions and/or methods disclosed and claimed herein can be made and executed without undue experimentation, given the present disclosure. While the articles, compositions and methods of the inventive concept(s) have been described in terms of preferred embodiments, it will be apparent to those of skill in the art that variations may be applied to the articles, compositions and/or methods and in the steps or in the sequence of steps of the methods described herein without departing from the concept, spirit and scope of the inventive concept(s). All such similar substitutes and modifications apparent to those skilled in the art are deemed to be within the spirit, scope and concept of the inventive concept(s) as defined by the appended claims.

As utilized under the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one."

The use of the term "or" in the claims is used to mean "and/or" unless explicitly indicated to refer to alternatives only or the alternatives are mutually exclusive, although the disclosure supports a definition that refers to only alternatives and "and/or."

Throughout this application, the term "about" is used to indicate that a value includes the inherent variation of error for the device, the method being employed to determine the value, or the variation that exists among the study subjects.

The use of the term "at least one" will be understood to include one as well as any quantity more than one, including but not limited to, 2, 3, 4, 5, 10, 15, 20, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

As used herein, the term "reagent" refers to any element, compound, ion, or molecule with which any portion of the fluid sample, or complex derived from the fluid sample, may react, for example to form a detectable signal. The reagents may be, but are not limited to, indicator dyes, metals, polymers, enzymes, proteins, peptides, nucleic acids, nucleotides, saccharides, lipids, antibodies, electrochemically-reactive substances, chemicals, radioactive elements or compounds, labels, or other analytes known to persons having ordinary skill in the art. The reagents may be placed on or incorporated into carriers (substrates) such as papers, membranes, polymers, or other carriers known in the art. The reagents may be dry, or wet. More than one reagent may be placed on a carrier. Typical chemical reactions which involve the reagents include, but are not limited to, dye binding, enzymatic, immunologic, oxidation or reduction chemistries.

In the following detailed description of embodiments of the inventive concept, numerous specific details are set forth in order to provide a more thorough understanding of the inventive concept. However, it will be apparent to one of ordinary skill in the art that the inventive concept within the disclosure may be practiced without these specific details. In other instances, well-known features have not been described in detail to avoid unnecessarily complicating the instant disclosure.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The volume of the fluid sample which the microfluidic device can receive can vary widely, for example between about 10 μL to about 1200 μL, and is usually in a range from about 10 μL to about 40 μL. The sample volumes which the fluid sample is apportioned into can vary, but typically, such samples have volumes of about 1 μL to 20 μL per reagent, although they may range from 0.1 μL to 200 μL per reagent, for example, depending on the type of fluid sample and the number of portions into which the fluid sample is separated.

The microfluidic device, in non-limiting embodiments, may be made of plastics such as polycarbonate, polystyrene, polyacrylates, or polyurethane, alternatively or in addition to, they can be made from silicates, and/or glass. When moisture absorption by the plastic is not a substantial concern, the plastics preferably used may include, but are not limited to, ABS, acetals, acrylics, acrylonitrile, cellulose acetate, ethyl cellulose, alkylvinylalcohols, polyaryletherketones, polyetheretherketones, polyetherketones, melamine formaldehyde, phenolic formaldehyde, polyamides (e.g., nylon 6, nylon 66, nylon 12), polyamide-imide, polydicyclopentadiene, polyether-imides, polyethersulfones, polyimides, polyphenyleneoxides, polyphthalamide, methylmethacrylate, polyurethanes, polysulfones, polyethersulfones and vinyl formal. When moisture absorption is of concern, preferably the plastics used to make the chip include, but are not limited to: polystyrene, polypropylene, polybutadiene, polybutylene, epoxies, Teflon™, PET, PTFE and chlorofluoroethylenes, polyvinylidene fluoride, PE-TFE, PE-CTFE, liquid crystal polymers, Mylar®, polyester, LDPE, HDPE, polymethylpentene, polyphenylene sulfide, polyolefins, PVC, and chlorinated PVC.

In one embodiment, the principle of operation of the system of the presently claimed and disclosed inventive concepts is that the sample is provided to a reagent in a reagent area (reaction chamber) through the use of a unidirectional hydrophilic capillary flow principle where the sample flows from a sample entry port, through the reaction chamber, towards an exit port. The microfluidic device may have a vent which is open to air during flow of the fluid sample. The valves disclosed herein are for controlling flow, stopping, advancing, or inhibiting "backflow" of the sub-samples therein (as explained below for example).

Described herein, and shown in the accompanying figures, are several non-limiting embodiments of microfluidic devices and sample analysis systems of the presently claimed and disclosed inventive concepts which may be used for analyzing a fluid sample according to the presently claimed and disclosed inventive concepts. The fluid sample is generally from a biological source. A "liquid" refers to any substance in a fluid state having no fixed shape but a substantially fixed volume.

The microfluidic devices of the presently claimed and disclosed inventive concepts typically use smaller channels (referred to herein as microchannels or microconduits) than have been used by previous workers in the field. In particular, the microchannels (microconduits) used in the presently claimed and disclosed inventive concept(s) typically have widths in the range of about 5 µm to 1000 µm, such as about 10 µm to 500 µm, whereas channels an order of magnitude larger have typically been used by others when capillary forces are used to move fluids. Depths of the microchannels are typically in a range of 5 µm to 100 µm. The minimum dimension for the microchannels is generally about 5 µm, unless it is desired to use smaller channels to filter out components in the sample being analyzed. It is also possible to control movement of the samples in the microchannels by treating the microchannels to become either hydrophilic or hydrophobic depending on whether fluid movement is desired or not. The resistance to movement can be overcome by a pressure difference, for example, by applying pumping, vacuum, electroosmosis, heating, or additional capillary force. As a result, liquids can move from one region of the device to another as required for the analysis being carried out.

The microfluidic devices of the presently claimed and disclosed inventive concepts, also referred to herein as "chips" or "microfluidic chips," are generally small and flat, typically, but not limited to, about 0.5 to 2 square inches (12.5 to 50 mm$^2$) or disks having, but not limited to, a radius of about 15 to 60 mm. The volume of apportioned fluid sample introduced into a particular microfluidic circuit will be small. By way of non-limiting example, the sample typically will contain only about 0.1 to 10 µL for each assay, although the total volume of a specimen may range from 10 to 200 µL. In one embodiment, the microfluidic device of the presently claimed and disclosed inventive concepts comprises a square or rectangular strip or card, or disk. The microfluidic devices (chips) used in the presently claimed and disclosed inventive concepts generally are intended to be disposable after a single use. Generally, disposable chips will be made of inexpensive materials to the extent possible, while being compatible with the reagents and the samples to be analyzed.

The microchannels of the microfluidic devices described herein typically are hydrophilic, which in one embodiment is defined regarding the contact angle formed at a solid surface by a liquid sample or reagent. Typically, a surface is considered hydrophilic if the contact angle is less than 90° and hydrophobic if the contact angle is greater than 90°. Plasma induced polymerization may be carried out at the surface of the passageways. The microfluidic devices of the presently claimed and disclosed inventive concepts may also be made with other methods used to control the surface energy of the capillary (microchannel) walls, such as coating with hydrophilic or hydrophobic materials, grafting, or corona treatments. The surface energy of the capillary walls may be adjusted, i.e., the degree of hydrophilicity or hydrophobicity, for use with the intended sample fluid, for example, to prevent deposits on the walls of a hydrophobic passageway or to assure that none of the liquid is left in a passageway. For most passageways in the presently claimed and disclosed inventive concepts, the surface is generally hydrophilic since the liquid tends to wet the surface and the surface tension force causes the liquid to flow in the passageway. For example, the surface energy of capillary passageways can be adjusted by known methods so the contact angle of water is between 10° to 60° when the passageway is to contact whole blood or a contact angle of 25° to 80° when the passageway is to contact urine.

Since a fluid sample may be introduced into the microfluidic device in several ways, the actual shape of the opening in the sample entry port may vary. The shape of the opening is not considered critical to the performance, since several shapes may be satisfactory. For example, it may be merely a circular opening into which the sample is placed. Alternatively, the opening may be tapered to engage a corresponding shape in a pipette, capillary, or outlet which deposits the sample. Such ports may be sealed closed so nothing can enter the microfluidic chip until the port is engaged by the device holding the sample fluid, such as a syringe or pipette. Depending on the carrier type, the sample may be introduced by a positive pressure, as when a plunger is used to force the sample into the entry port. Alternatively, the sample may be merely placed at the opening of the entry port and capillary action used and atmospheric pressure to pull or push the sample into the microfluidic device. Excess sample is preferably not to be left on a surface however, since cross-contamination may occur. Also, in alternate embodiments, the sample may be placed at the opening of the entry port and a vacuum used to pull the sample into the microfluidic chip. As has been discussed, when the opening is small, sufficient capillary forces are created by the interaction of the passage walls and the surface tension of the liquid. Typically, biological samples contain water and the walls of the entry port and associated passageways will be hydrophilic so the sample will be drawn into the microfluidic chip even absent added pressure.

The microfluidic device in certain embodiments contains mechanisms or means for separating cellular components from the plasma. For example, a separation area may contain membranes or glass fibers for separating red blood cells from plasma so they do not interfere with the analysis of plasma. One or more blood anti-coagulants (e.g., heparin, EDTA, oxalates, sodium citrate, acid citrate dextrose, and sodium fluoride/potassium-oxalate) may be included in the microchannel, reagent area, or elsewhere to prevent coagulation, and hemolytic reagents may be included to cause lysis of cells.

Any of the chambers or microchannels of the microfluidic device may comprise microstructures known in the art used to assure uniform contact and mixing of the liquid sample with a reagent or other agent disposed in the reagent area or in the microchannel. In some cases, the reagents are liquids coated on a porous support and dried. For example, the microstructures may comprise an array of posts disposed in a reagent area so the liquid sample must pass from the entry port in a non-linear, non-direct, direction. The liquid is constantly forced to change direction as it passes through the array of posts. Each of the posts may contain one or more wedge-shaped cutouts which facilitate the movement of the liquid as discussed in U.S. Pat. No. 6,296,126, for example.

Other types of microstructures which are useful are known to persons having ordinary skill in the art and include (but are not limited to) three-dimensional post shapes with cross-sectional shapes that can be circles, stars, triangles, squares, pentagons, octagons, hexagons, heptagons, ellipses, crosses or rectangles or combinations thereof. Microstructures with two-dimensional shapes such as a ramp leading to reagents on plateaus may also be useful.

Microfluidic devices of the presently claimed and disclosed inventive concepts have many applications. Analyses may be carried out on samples of many fluids of biological origin which are fluids or have been fluidized including, but not limited to, blood, plasma, serum, urine, bladder wash, saliva, sputum, spinal fluid, intestinal fluid, intraperitoneal fluid, food, cystic fluids, ascites, sweat, tears, feces, semen, nipple aspirates, and pus. As noted above, blood is of particular interest. Also included are processed biological fluids such as milk, juices, wines, beer, and liquors. Fluids of non-biological origin or which may be contaminated, such as water, are also included. A sample of the fluid to be tested is deposited in the entry port of the microfluidic device and apportioned into several subsamples which are distributed into a plurality of reaction chambers (reagent areas) to react with a reagent therein and to be analyzed after the reaction. Biological samples analyzed may be obtained from any biological sample including humans or any other mammal, birds, fish, reptiles, amphibians, insects, crustaceans, marine animals, plants, fungi, and microorganisms. The reacted sample will be assayed for the substance, or analyte of interest.

The fluid sample may be assessed for contamination microorganisms such as *E. coli, Pseudomonas* sp., *H. pylori, Streptococcus* sp., *Chlamydia* and mononucleosis pathogens. Metals which may be detected include, but are not limited to, iron, manganese, sodium, potassium, lithium, calcium, and magnesium.

In many applications, it is desired to measure a color, light or wavelength emission developed by the reaction of reagents with the sample fluid and which may be measured or detected by analyzers known to those of ordinary skill in the art. It is also feasible to make electrical measurements of the sample, using electrodes positioned in the small wells in the chip. Examples of such analyses include electrochemical signal transducers based on amperometric, impedimetric, or potentimetric detection methods. Examples include the detection of oxidative and reductive chemistries and the detection of binding events.

It is contemplated that virtually any reagent used in the fields of biological, chemical, or biochemical analyses could be used in the microfluidic devices of the presently claimed and disclosed inventive concepts. Reagents may undergo changes whereby the intensity, nature, frequency, or type of the signal generated is proportional to the concentration of the analyte measured in the clinical specimen. These reagents may contain indicator dyes, metals, enzymes, polymers, antibodies, electrochemically reactive ingredients and various other chemicals placed onto carriers (also referred to herein as reagent substrates). Carriers often used are papers, membranes or polymers with various sample uptake and transport properties. Liquid reagents, when used, are preferably isolated by barrier materials which prevent migration of water throughout the device, thus avoiding changes in the concentration through transpiration or evaporation and preventing moisture from reaching the dry reagents.

Any method of detecting and measuring an analyte in a liquid sample can be used in the microfluidic devices of the presently claimed and disclosed inventive concepts. A variety of assays for detecting analytes are well known in the art and include, for example, enzyme inhibition assays, antibody stains, latex agglutination, and immunoassays, e.g., radioimmunoassay. The term "antibody" herein is used in the broadest sense and refers to, for example, intact monoclonal antibodies, polyclonal antibodies, multispecific antibodies (e.g., bispecific antibodies), and to antibody fragments that exhibit the desired biological activity (e.g., antigen-binding). The antibody can be of any type or class (e.g., IgG, IgE, IgM, IgD, and IgA) or sub-class (e.g., IgG1, IgG2, IgG3, IgG4, IgA1 and IgA2).

Immunoassays as noted, including radioimmunoassay and enzyme-linked immunoassays, are useful in the methods of the presently claimed and disclosed inventive concepts. A variety of immunoassay formats, including, for example, competitive and non-competitive immunoassay formats, antigen capture assays and two-antibody sandwich assays can be used in the methods of the invention. Enzyme-linked immunosorbent assays (ELISAs) can be used in the presently claimed and disclosed inventive concepts. With an enzyme immunoassay, an enzyme is typically conjugated to the second antibody, generally by means of glutaraldehyde or periodate. As will be readily recognized, however, a wide variety of different conjugation techniques exist which are readily available to one skilled in the art.

In certain embodiments, the analytes are detected and measured using chemiluminescent detection. For example, in certain embodiments, analyte-specific antibodies are used to capture an analyte present in the biological sample and an antibody specific for the specific antibodies and labeled with a chemiluminescent label is used to detect the analyte present in the sample. Any chemiluminescent label and detection system can be used in the present devices and methods. Chemiluminescent secondary antibodies can be obtained commercially from various sources. Methods of detecting chemiluminescent secondary antibodies are known in the art and are not further discussed herein in detail.

Examples of assays that may be carried out using the microfluidic devices described herein include, but are not limited to, tests for blood gases, clotting factors, immunogens, bacteria, and proteins. In one embodiment the assays that may be detected with the test device is a "luminescent $O_2$ channel assay" (LOCI®) which includes the use of for example, Sandwich Assays based on an analyte-specific antibody and a biotinylated antibody wherein specific wavelengths are generated by the fluid subsample and detected by the test device. Reagent configurations for the assay method include for example Sandwich Formats based on an antigen or an antibody, a Competitive Format, or a Sandwich Format with Extended Linker and may be used in immunoassays, infectious disease testing, and DNA testing. Specific blood chemicals which may be measured include, but are not limited to, TSH, free T4, free T3, Total PSA, free PSA, AFP, CEA, CA15.3, CA 19-9, CA 125, Cardiac Troponin-I, NT-pro BNP, myoglobin, mass CKMB (MMB), BNP, Ferritin, Vitamin $B_{12}$, Folate, total B-HCG, FSH, LH, prolactin, estradiol, testosterone, progesterone, and digoxin.

Fluorescent detection also can be useful for detecting analytes in the presently claimed and disclosed inventive concepts. Useful fluorochromes include, but are not limited to, DAPI, fluorescein, lanthanide metals, Hoechst 33258, R-phycocyanin, B-phycoerythrin, R-phycoerythrin, rhodamine, Texas red and lissamine. Fluorescent compounds, can be chemically coupled to antibodies without altering their binding capacity. When activated by illumination with light of a particular wavelength, the fluorochrome-labelled antibody adsorbs the light energy, inducing a state of excitability in the molecule, followed by emission of the light at a characteristic color visually detectable with a light microscope. Radioimmunoassays (RIAs) can be useful in certain methods of the invention. Such assays are well known in the art. Radioimmunoassays can be performed, for example, with $^{125}$I-labeled primary or secondary antibody.

Separation steps are possible in which an analyte is reacted with reagent in a first reaction chamber and then the reacted reagent or sample is directed to a second reaction chamber for further reaction. In addition, a reagent can be re-suspended in a first reaction chamber and moved to a second reaction chamber for a reaction. An analyte or reagent can be trapped in a first or second chamber and a determination made of free versus bound reagent. Determining a free versus bound reagent is particularly useful for multizone immunoassay and nucleic acid assays. There are various types of multizone immunoassays that could be adapted to this device. With adaption of immunochromatography assays, reagent filters are placed into separate wells and need not be in physical contact as chromatographic forces are not in play. Immunoassays or DNA assay can be developed for detection of bacteria such as Gram-negative species (e.g., *E. coli, Enterobacter, Pseudomonas, Klebsiella*) and Gram-positive species (e.g., *Staphylococcus aureus, Enterococcus*). Immunoassays can be developed for complete panels of proteins and peptides such as albumin, hemoglobin, myoglobulin, α-1-microglobulin, immunoglobulins, enzymes, glycoproteins, protease inhibitors, drugs and cytokines. The device may be used in analysis of urine for one or more components therein or aspects thereof, such as, but not limited to, leukocytes, nitrites, urobilinogen, proteins, albumin, creatinine, uristatin, calcium oxalate, myoglobin, pH, blood, specific gravity, ketone, bilirubin and glucose.

Referring now to the drawings, and more particularly to FIGS. 1-6, shown therein is an exemplary embodiment of a microfluidic device 10 constructed in accordance with the inventive concepts disclosed and claimed herein. The microfluidic device 10 comprises a first substrate 12, a valve 13 including a resilient diaphragm 14 and an actuator 16, and a second substrate 18.

Figure 1:
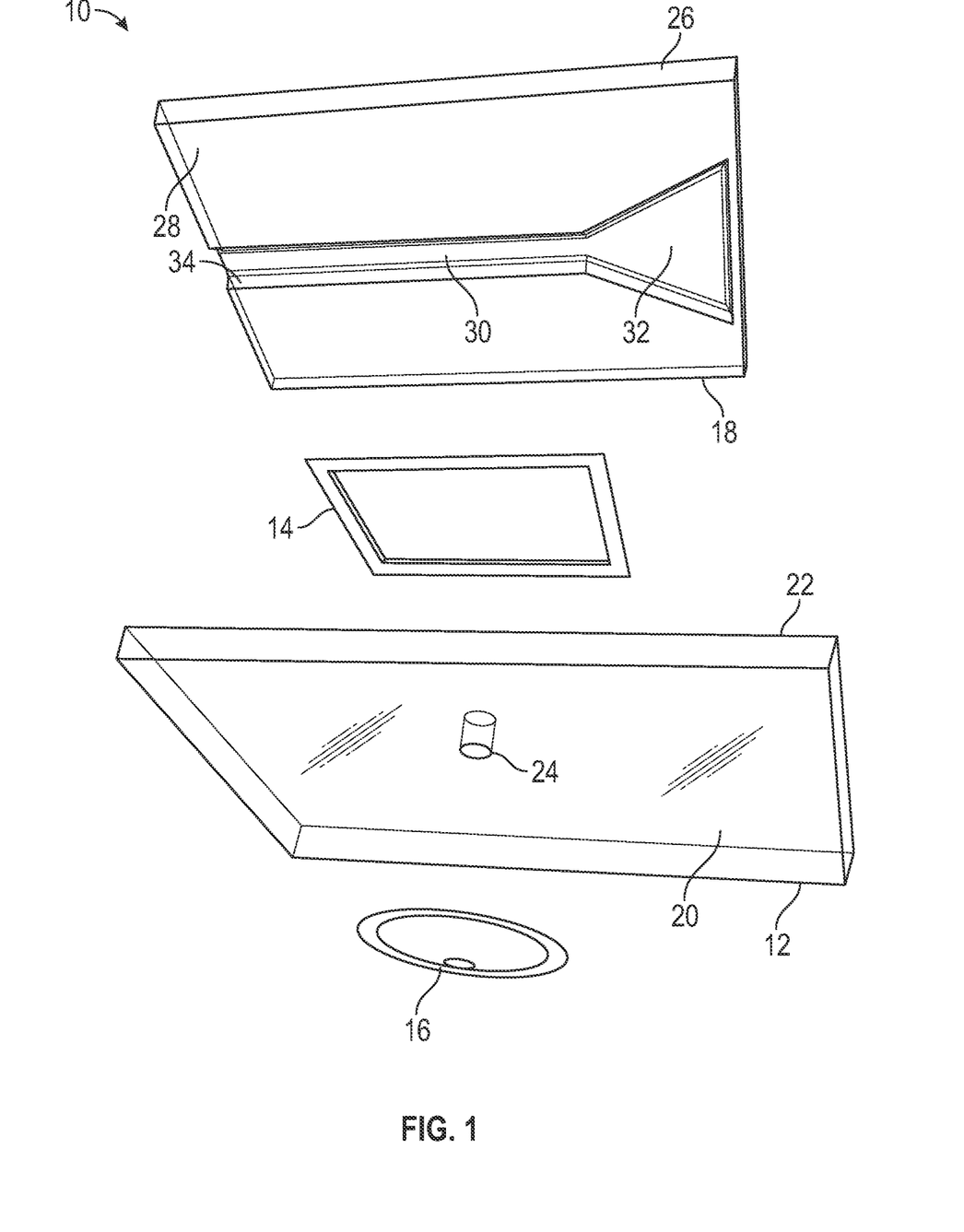
FIG. 1 is an exploded, perspective view of an exemplary embodiment of a microfluidic device according to the inventive concepts disclosed herein.
Figure 2:
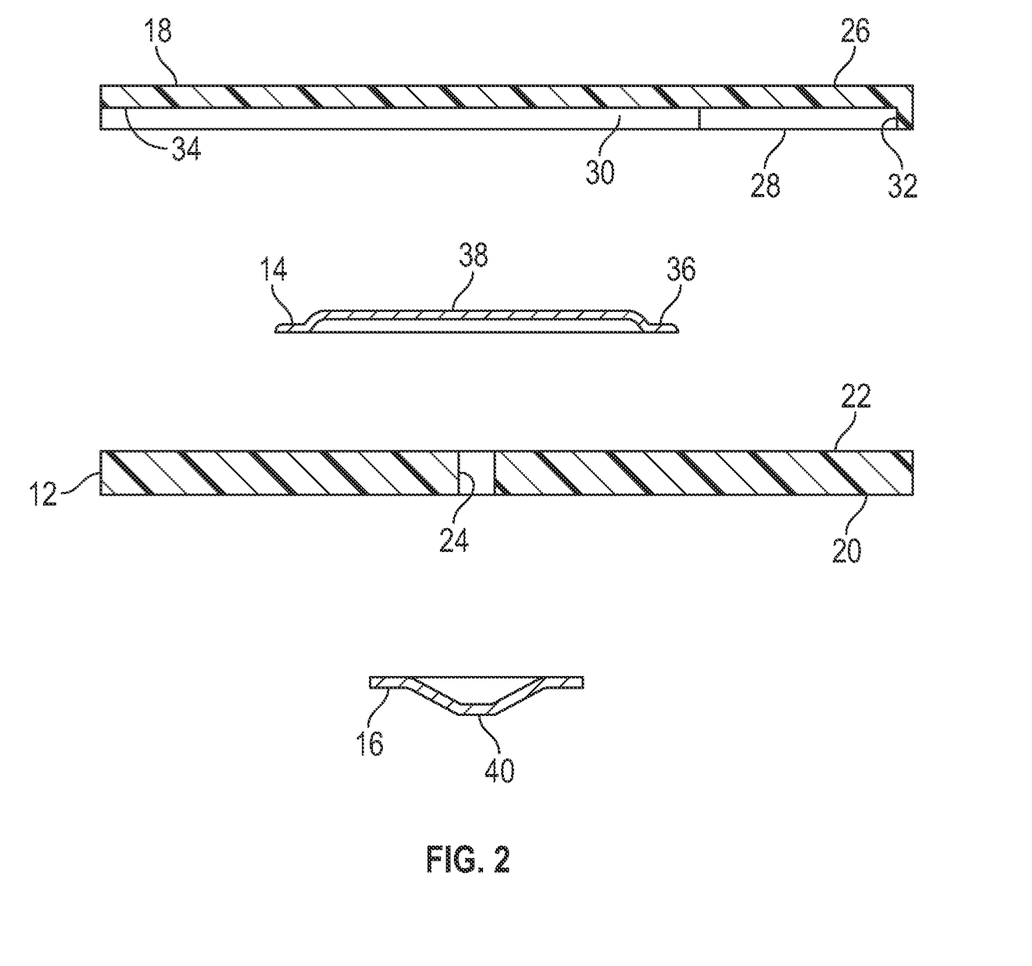
FIG. 2 is a longitudinal, cross-sectional view of the microfluidic device of FIG. 1.

The first substrate 12 includes a first side 20 and an opposing second side 22. The first substrate 12 has an opening 24 extending through the first substrate 12 from the first side 20 to the second side 22. The opening 24 may have a cross-section of any suitable geometry, including, but not limited to, circular, oval, square, or rectangular. The opening 24 may be molded or cut into the first substrate 12, or otherwise pre-fabricated.—The first substrate 12 may be transparent to allow for imaging and observation of the fluid sample as it is passed through the microfluidic device 10.

The resilient diaphragm 14 can be deformed under pressure. The resilient diaphragm 14 may have a thickness suitable for allowing deformation upon application of a mechanical force or pressure. The mechanical pressure, for example, and not by way of limitation, may be a pneumatic pressure that pushes the resilient diaphragm 14 away from the second side 22 of the first substrate 12. The resilient diaphragm 14 may be deformed from a substantially planar configuration to a non-planar configuration. In one embodiment, the resilient diaphragm 14 may be sized such that the it may be deformed upon application of a pressure of about 30 psi. In another embodiment, the resilient diaphragm may be sized such that it may be deformed under application of a pressure of about 14.7-50 psi.

The resilient diaphragm 14 may also include indentations, recesses, or depressions to form a raised peripheral edge 36. The raised peripheral edge 36 surrounds and defines a distensible region 38 of the resilient diaphragm 14 that remains unattached to the second side 22 of the first substrate 12. The distensible region 38 may at least partially overlie the opening 24 of the second side 22 of the first substrate 12. The distensible region 38 may be deformed upon application of appropriate mechanical force. The distensible region 38 may have any suitable shape and geometry. The resilient diaphragm 14 may be substantially unsupported in the distensible region 38 where it is unattached to the second side 22 of the first substrate 12. As such, deformation of the resilient diaphragm 14 will cause the distensible region 38 to extend away from the second side 22 of the first substrate 12 due to the application of mechanical force, such as, for example, pneumatic force.

The resilient diaphragm 14 of the valve 13 is secured to the second side 22 of the first substrate 12 to surround the opening 24 extending from the first side 20 to the second side 22 of the first substrate 12.

The actuator 16 is secured to the first side 20 of the first substrate 12 surround the opening 24 on the first side 20. The actuator 16, the first substrate 12 and the resilient diaphragm 14 cooperate to form a gas-tight chamber 42. The gas-tight chamber 42 is used to apply pneumatic pressure to the resilient diaphragm 14 and the actuator 16.

Figure 3:
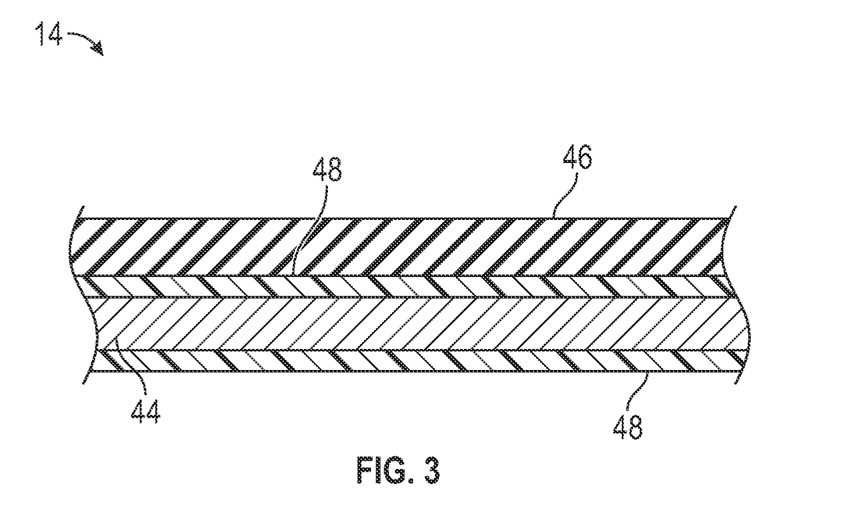
FIG. 3 is a cross-sectional view of a portion of a resilient diaphragm.

Referring now to FIG. 3, shown therein is a cross-section view of the layers of the resilient diaphragm 14 of the microfluidic device 10. The resilient diaphragm 14 may be formed of material including, but not limited to, one or more layers of a polymer, a metal, and/or the like. In some embodiments, the resilient diaphragm 14 may comprise at least one inner gas impervious material layer 44, at least one outer polymeric material layer 46, and at least two layers of plastic 48 coating the gas impervious material layer 44. In one embodiment, the gas impervious material layer 44 is formed of aluminum. The gas impervious material layer 44 of the resilient diaphragm 14 may be formed of materials including, but not limited to, aluminum, copper, tin, or gold. The at least one polymeric material layer 46 may improve channel seal. The polymeric material layer 46 may be formed of materials including, but not limited to, polystyrene or polyisoprenes. The at least two plastic layers 48 may be formed of materials including, but not limited to, nylon, PET, acrylonitrile, butadiene, styrene, polyethylene, or combinations thereof. The at least one plastic layers 48 may reduce tearing of the thinned gas impervious material layer 44.

For example, the resilient diaphragm 14 may include a gas impervious material layer 44 of aluminum sandwiched between layers of plastic 48 with an outer polymeric layer 46 as rubber sealing layer. In some embodiments, the resilient diaphragm 14 may only be metalized on one side, instead of having a gas impervious layer 44 sandwiched between plastic layers 48. The gas impervious material layer 44 of the resilient diaphragm 14 may be mated to the at least one plastic layer 48 to form the resilient diaphragm 14 by vapor deposition, electrolysis, thermal/adhesive bonding, and bound/thinned by pressing through rollers.

Figure 4:
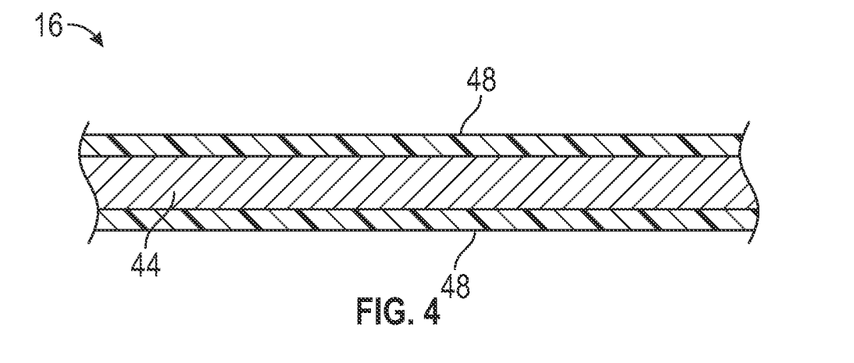
FIG. 4 is a cross-sectional view of a portion of an actuator.

The actuator 16 may be formed of a flexible yet pierceable material, penetrable material, a rigid material, and/or a rigid yet pierceable and/or penetrable material. The actuator 16 may have a blister region 40 unattached to the first side 20 of the first substrate 12. The blister region 40 of the actuator 16 overlies the opening 24. The actuator 16 may be substantially unsupported in the blister region 40 where it is unattached to the first side 20 of the first substrate 12. As such, deformation of the actuator 16 may cause the blister region 40 to expand away from the first side 20 of the first substrate 12 due to the application of mechanical force.

The actuator 16 may include at least one gas impervious material layer 44 and at least one layer of plastic 48. In one embodiment, the gas impervious material layer 44 is formed of aluminum. The gas impervious material layer 44 of the actuator 16 may be formed of materials including, but not limited to, aluminum, copper, tin, or gold. The at least one plastic layer 48 may be formed of materials including, but not limited to, nylon, PET, acrylonitrile, butadiene, styrene, polyethylene, or combinations thereof. The at least one plastic layer 48 may reduce tearing of the thinned gas impervious material layer 44. The gas impervious material layer 44 of the actuator 16 may be mated to the at least one plastic layer 48 to form the actuator 16 by vapor deposition, electrolysis, thermal/adhesive bonding, and bound/thinned by pressing through rollers.

The second substrate 18 has a first side 26, an opposing second side 28, and at least one channel 30 formed in the second side 28. In some embodiments, the second substrate 18 may also include a plurality of the channels 30, and the plurality of channels 30 may be interconnected. The channel 30 may have a first end 32 and a second end 34. The first end 32 of the channel 30 may be of a size and shape such as to house a reagent, a volume of fluid, and/or a microstructure, such as, for example, a vent, container, filter, and/or the like. In some embodiments, the second substrate 18 may include a sample receiving reservoir in fluid communication with the second end 34 of the channel 30. The second substrate 18 is secured to the first substrate 12 such that the second side 22 of the first substrate 12, including the resilient diaphragm 14, and the second side 28 of the second substrate 18 are in face-to-face contact. It will be appreciated there are several ways the various components of the microfluidic device 10 can be formed in the second substrate 18, such as, but not limited to, injection molding, laser ablation, diamond milling, embossing, and combinations thereof, for example.

The second substrate 18 may be secured (permanently or detachably) to the first substrate 12 in any suitable manner, such as by molding, ultrasonic welding, radiofrequency welding, bonding, gluing, double-sided adhesive tapes, and combinations thereof, for example, provided that a substantially fluid-impermeable connection is formed between the first substrate and the second substrate.

It will be appreciated by those of ordinary skill in the art that the first substrate 12 and the second substrate 18 may be formed of one or more layers. For example, the second substrate 18 may be formed of a first layer provided with a slot or groove and a second layer may be connected to the first layer to form a channel. The first layer in turn would be secured to the first substrate as described above.

Figure 5:
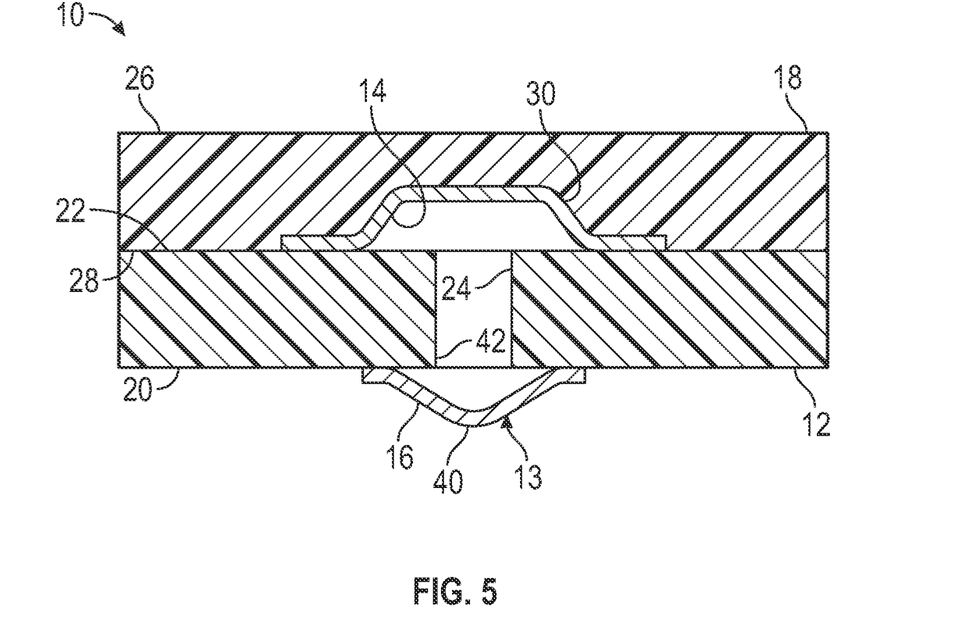
FIG. 5 is a lateral, cross-sectional view of the microfluidic device shown assembled and in a pressurized condition.

A volume of gas is disposed in the gas-tight chamber 42 to pressurize the gas-tight chamber 42 and expand the resilient diaphragm 14 such that the resilient diaphragm 14 is disposed in the channel 30 between the first end 32 and the second end 34 (FIG. 5). The resilient diaphragm 14 retracts from the channel 30 to open the channel 30 from the first end 32 and the second end 34 when the gas-tight chamber 42 is depressurized (FIG. 6).

Referring to FIG. 5, shown therein is a cross-sectional view of the microfluidic device 10 in a pressurized condition. A volume of gas, such as, for example, propane, is disposed in the gas-tight chamber 42 to pressurize the gas-tight chamber 42. A sufficient amount of gas is disposed in the gas-tight chamber 42 to cause the deformation of the actuator 16 and the resilient diaphragm 14. The actuator 16 may be deformed to extend away from the first side 20 of the first substrate 12, forming a blister over the opening 24. The resilient diaphragm 14 may be deformed to extend away from the second side 22 of the first substrate 12 where at least a portion of the resilient diaphragm 14 may become deposed in the channel 30 between the first end 32 and the second end 34, forming a fluid-tight seal between the first end 32 of the channel 30 and the second end 34 of the channel 30.

Figure 6:
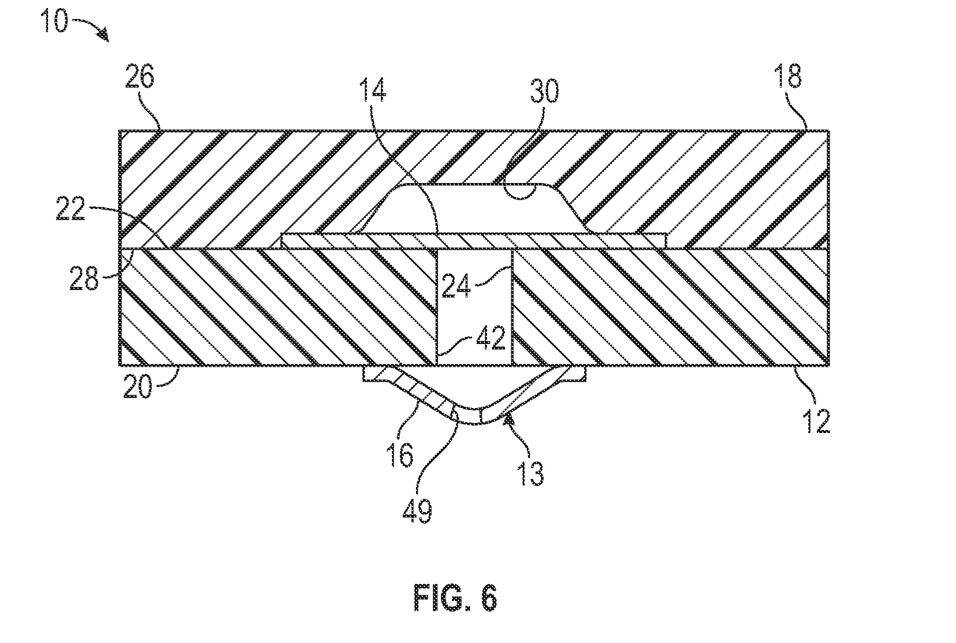
FIG. 6 is a lateral, cross-sectional view of the microfluidic device of FIG. 5 shown in a depressurized condition.

Referring to FIG. 6, shown therein is a cross-sectional view of the microfluidic device 10 in a depressurized condition. Depressurization of the gas-tight chamber 42 results in the resilient diaphragm 14 retracting from the channel 30 to open the channel 30 from the first end 32 and the second end 34. The gas-tight chamber 42 may be depressurized by, for example, by the application of force to the actuator 16, to allow for the rupture of the actuator 16 (depicted by reference numeral 49). Depressurizing the gas-tight chamber 42 causes in the resilient diaphragm 14 to retract and lie substantially flat against the second side 22 of the first substrate 12. Retracting the resilient diaphragm 15 from the channel 30 allows for fluid communication between the first end 32 and the second end 34 of the channel 30.

Figure 7A:
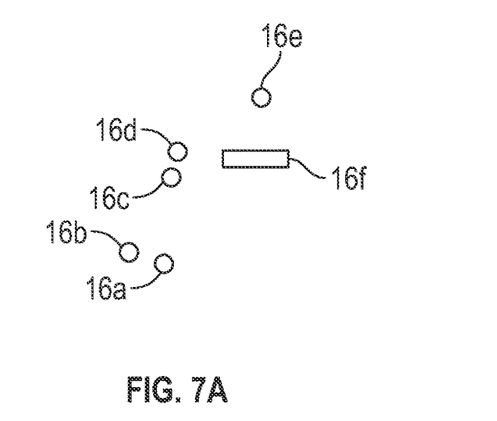
FIGS. 7A-7G are exploded layers for forming another exemplary embodiment of a microfluidic device according to the inventive concepts disclosed herein.
Figure 7B:
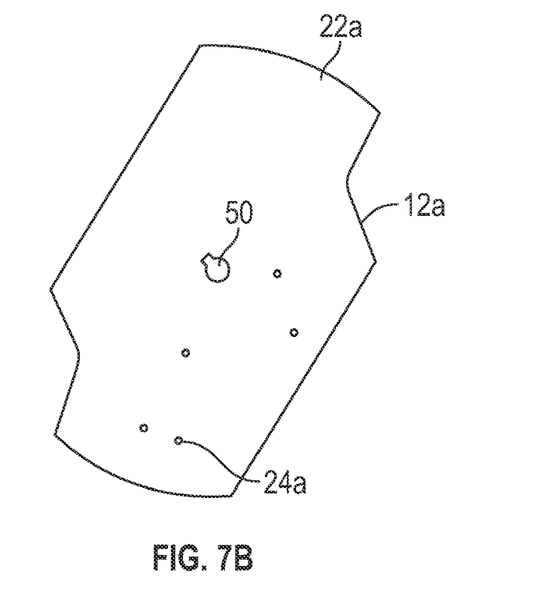
Figure 7C:
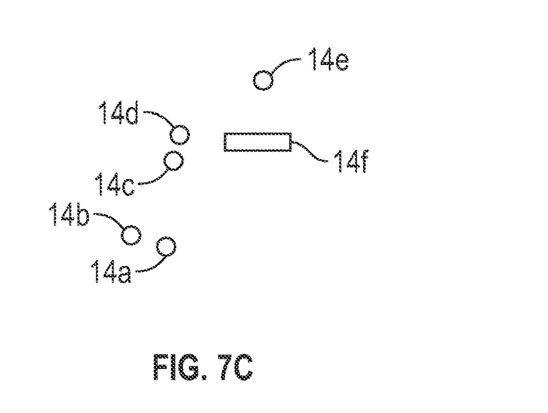

Referring now to FIGS. 7A-7G and 8, shown therein is an exploded view and assembled view, respectively, of another exemplary embodiment of the microfluidic device 10a constructed in accordance to the inventive concepts disclosed herein. In this embodiment, the microfluidic device 10a includes a first substrate 12a, a plurality of resilient diaphragms 14a-14f, a plurality of actuators 16a-16f, a second substrate 18a, a third substrate 18b, a fourth substrate 18c, and a fifth substrate 18d. Each of the first, second, third, fourth, and fifth substrates 18a-18d further includes a spindle port 50 extending axially through each of the first, second, third, fourth, and fifth substrates 18a-18d. In this embodiment, the plurality of actuators 16a-16f and the plurality of resilient diaphragms 14a-14f is shown in FIGS. 7A and 7C, respectively, have varying geometric configurations, such as circular (14a-14e; 16a-16e) and rectangular (14f, 16f).

In this embodiment, the first substrate 12a, as shown in FIG. 7B, has a first side (not shown), an opposing second side 22a, and a plurality of openings 24a extending through the first substrate 12a from the first side to the second side 22a of the first substrate 12a.

The plurality of resilient diaphragms 14a-14f, as shown in FIG. 7C, may be secured to the second side 22a of the first substrate 21a such that each of the resilient diaphragms 14a-14f may surround each of the plurality of openings 24a extending from the first side to the second side 22a of the first substrate 12a. The plurality of actuators 16a-16f, as shown in FIG. 7A, may be secured to the first side of the first substrate 12a such that each of the plurality of actuators 16a-16f surround each of the plurality of openings 24a on the first side of the first substrate 12a. The first substrate 12a, each of the plurality of actuators 16a-16f, and each of the plurality of resilient diaphragms 14a-14f, cooperate to form a plurality of gas-tight chambers (not shown).

Figure 7D:
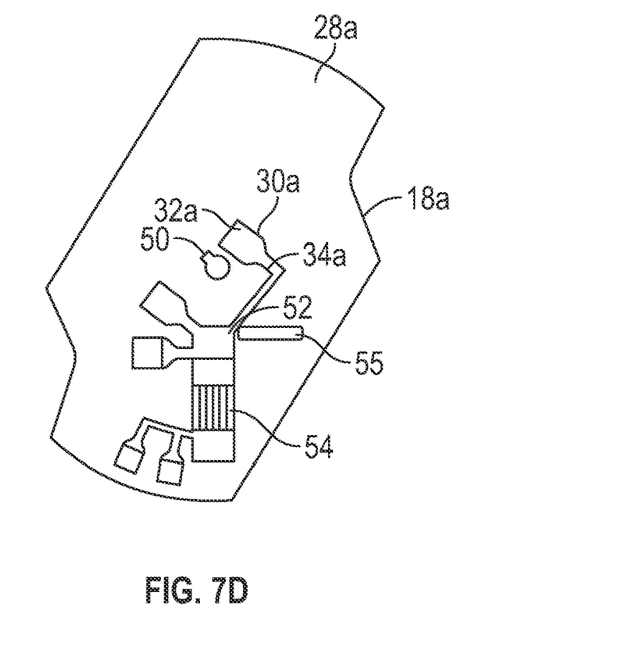

Each of the second, third, fourth, and fifth substrate 18a-18d, as shown in FIGS. 7D-7G, respectively, has a first side (not shown), and a second side 28a-28d opposing the first side. The second substrate 18a, as shown in FIG. 7D, includes a plurality of channels 30a and a sample receiving reservoir 52 extending through the second substrate 18a in the form of slots. The second substrate 18a further includes a rectangular through hole 55 extending from the first side of the second substrate 18a to the second side 28b of the third substrate 18b. Connection of the second substrate 18a to the first substrate 12a and the third substrate 18b defines the channels 30a and the sample receiving reservoir 52. The plurality of channels 30a each having a first end 32a and a second end 34a. The first end 32a of each of the plurality of channels 30a sized and shaped to house a reagent or other fluid and/or a microstructure, such as a vent, container, and/or the like. The second end 34a of each of the plurality of channels 30a operable to be in fluid communication with the sample receiving reservoir 52 and/or the one or more filters 54. The second substrate 18a may be secured to the first substrate 12a such that the second side 22a of the first substrate 12a, including the plurality of resilient diaphragms 14a-14f attached thereto, and the first side of the second substrate 18a are in face-to-face contact.

Figure 7E:
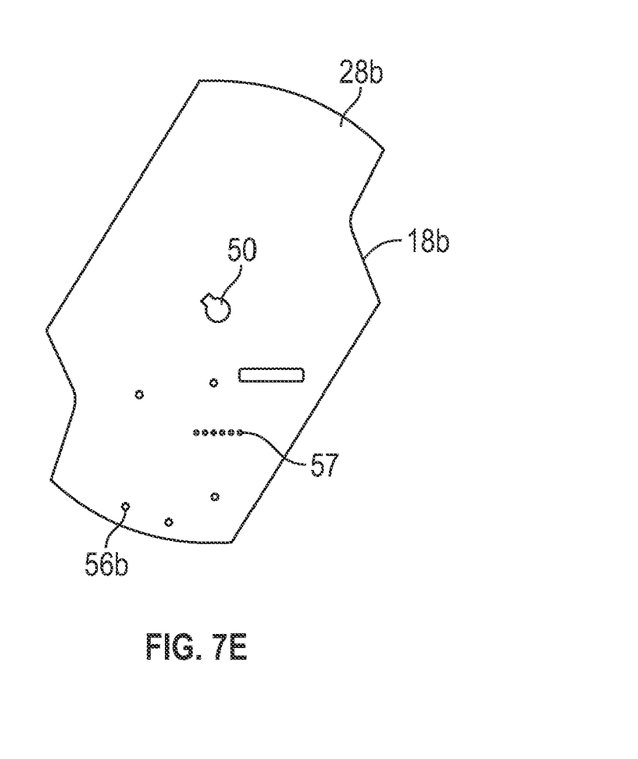
Figure 7F:
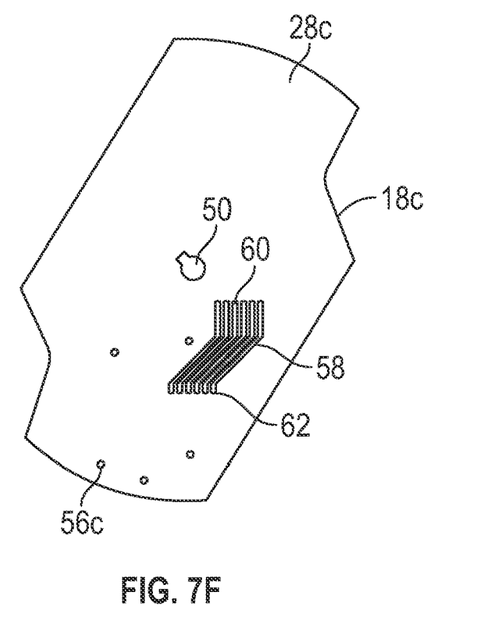
Figure 7G:
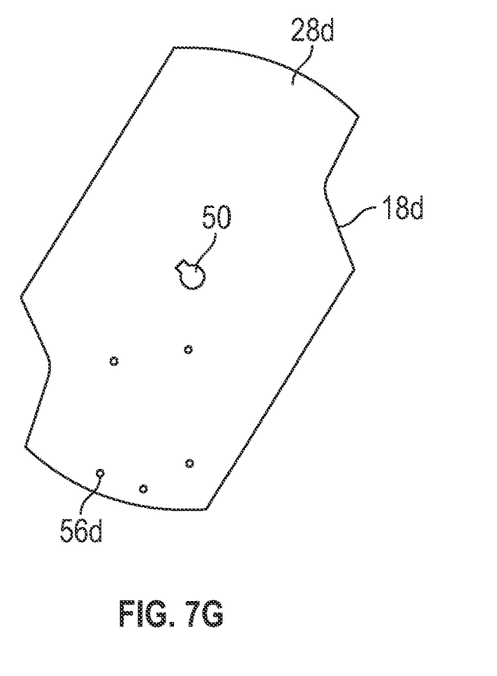

The third, fourth, and fifth substrates 18b-18d, as shown in FIGS. 7E-7G, respectively, each includes a plurality of vent holes 56b-56d that extend axially through each of the third, fourth, and fifth substrates 18b-18d. Each of the plurality of vent holes 56b-56d corresponding to the first end 32a of one or more of the plurality of channels 30a.

The third substrate 18b, as shown in FIG. 7E, has a plurality of parallel through holes 57, positioned in a row, extending axially through the third substrate 18b from the first side to the second side 28b of the third substrate 18b.

The fourth substrate 18c, as shown in FIG. 7F, has a plurality of parallel channels 58 formed in the second side 28c that extend longitudinally along the fourth substrate 18c. Each of the plurality of parallel channels 58 having a first end 60 and a second end 62. Each of the second end 62 of the plurality of parallel channels 58 terminate correspondingly to the positions of each of the plurality of parallel through holes 57 on the second side 28b of third substrate 18b.

The fifth substrate 18d, as shown in FIG. 7G, is secured to the fourth substrate 18c such that the second side 28c of the fourth substrate 18c and the first side of the fifth substrate 18d are in face-to-face contact. Similarly, the fourth substrate 18c is secured to the third substrate 18b such that the second side 28b of the third substrate 18b and the first side of the fourth substrate 18c are in face-to-face contact. The third substrate 18b is secured to the second substrate 18a such that the second side 28a of the second substrate 18a and the first side of the third substrate 18b are in face-to-face contact. The second substrate 18a is secured to the first substrate 12a such that the second side 22a of the first substrate 12a and the first side of the second substrate 18a are in face-to-face contact.

Figure 8:
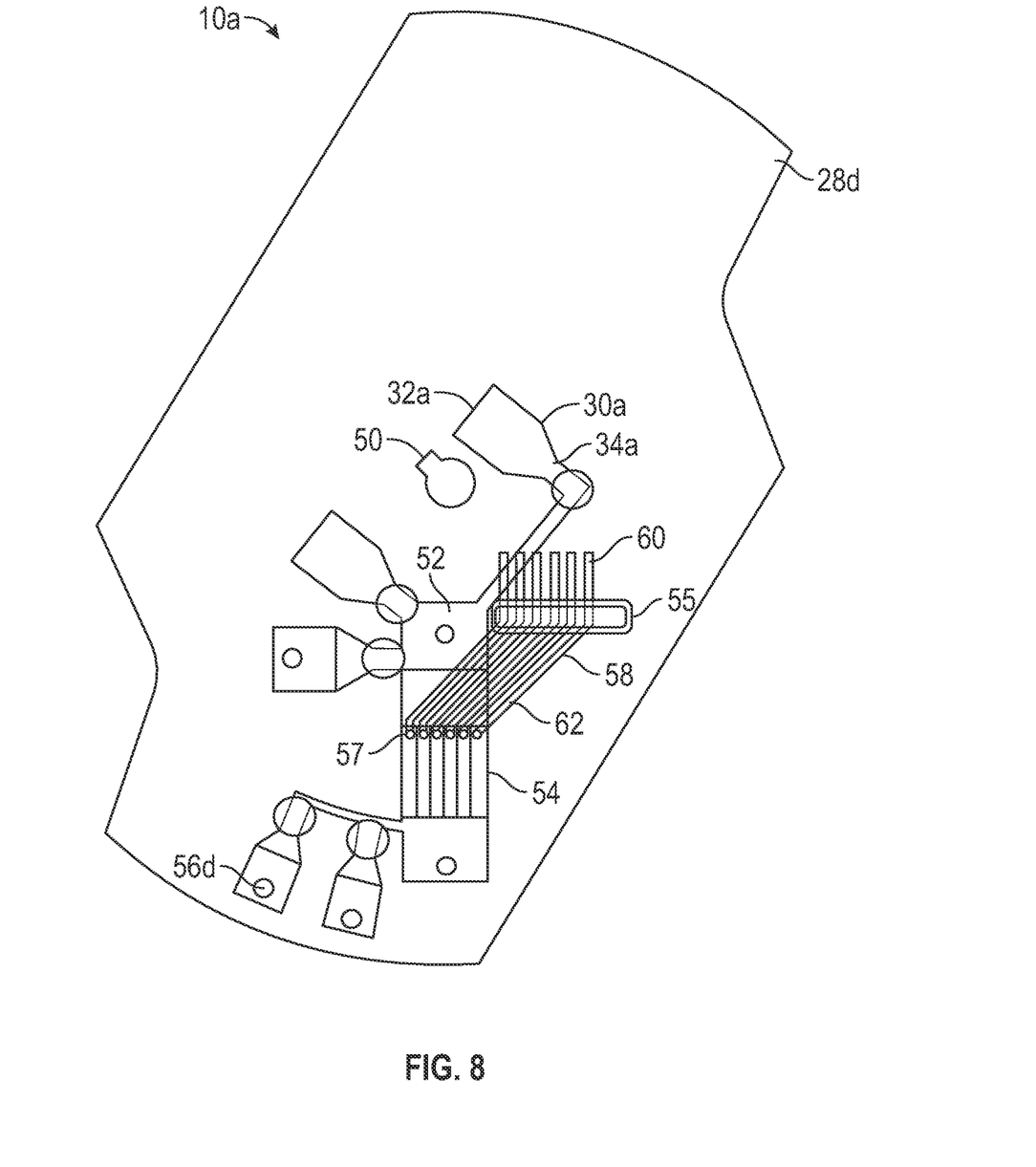
FIG. 8 is a top plan view showing the layers of FIGS. 7A-7G assembled to form the microfluidic device.

A volume of gas is disposed in the gas-tight chambers formed by the plurality of actuators 16a-16f, the plurality of resilient diaphragms 14a-14f, and the first substrate 12a, to pressurize the gas-tight chamber and, thereby, deform each of the plurality of actuators 16a-16f and each of the plurality of resilient diaphragms 14a-14f. At least one of the plurality of resilient diaphragms 14a-14f deforms to extend through the rectangular through hole 55 extending from the first side of the second substrate 18a to the second side 28b of the third substrate 18b. Each of the plurality of resilient diaphragms 14a-14f are deformed such that at least a portion of each of the resilient diaphragms 14a-14f is disposed in each of the plurality of channels 30a between the first end 32a and the second end 34a, forming a fluid-tight seal between the first end 32a of each of the plurality of channels 30a and the second end 34a of each of the plurality of channels 30a, as shown in FIG. 8.

The microfluidic devices 10 and 10a may be referred to as a "cartridge," "chip" or "disk." The microfluidic device 10 is generally small and flat, having a shape and dimensions as discussed elsewhere herein. The microfluidic device 10 is shown as having a rectangular shape, however it will be understood that the shapes of the microfluidic devices of the presently claimed and disclosed inventive concepts, include but are not limited to, round, rectangular, trapezoidal, irregular, oval, star, or any other geometric shape which allows the microfluidic passageways therein to function in accordance with the presently claimed and disclosed inventive concepts. It will be appreciated there are several ways the various components of the microfluidic channel system 22 can be formed in the base portion 12, such as, but not limited to, injection molding, laser ablation, diamond milling, embossing, and combinations thereof, for example.

Fluid samples and subsamples thereof may be propelled into and through the microchannels of the microfluidic devices described herein by passive or active fluidics including, but not limited to, capillary force, syringe pump, pistons, pneumatic, actuators, centrifugation, solenoids, linear actuators, peristaltic pump, electrophoresis, memory alloy valves, surface acoustic wave, or combinations of the above.

The fluid samples and subsamples thereof may be mixed before, during, or after exposure to the reagents in the reagent areas. Mixing may be by passive or active mechanisms. For example, passive mechanisms include, but are not limited to, herring bone features, posts, or chevrons, and active mechanisms include, but are not limited to, piezo electric motors, surface acoustic wave means, centrifugal force, electrophoresis, and magnetic movement of particles, and combinations thereof.

Reagents may be disposed or deposited in the reagent areas (or elsewhere in the microchannel) as dry powders, lyophilized spheres or granules, dried on a surface of the reagent area chamber, as liquids, for example, in pouches or blister packs, or on substrates as discussed elsewhere herein. In general, whole blood samples will need to be exposed to an anticoagulant (e.g., heparin) in the reagent area or in a portion of the microchannel upstream of the reagent area. Samples to be hemolyzed will generally require a surfactant or lysing agent (e.g., Saponin) in the reagent area or upstream thereof. In a microchannel designed to assay a whole blood sample to be hemolyzed, the microchannel may be absent a discrete reagent area such that the surfactant or lysing agent may simply be deposited in a channel between the valve and the exit port (or metering area, if present).

The microchannels described herein are shown generally as linear thereby allowing a substantially straight-line flow of fluid therethrough. It is to be understood, however, that the present inventive concepts are not limited to straight flow paths and may comprise curved, angled, or otherwise non-linear microchannel flow paths. It is to be further understood that a first portion of a microchannel may be straight, and a second portion of the same microchannel may be curved, angled, or otherwise non-linear.

The microfluidic device of the presently disclosed and claimed inventive concepts may further include one or more sensors in fluidic communication with the microchannel for detecting some aspect of the subsample therein. Such sensors are well known in the art, and therefore no further discussion thereof is deemed necessary.

From the above description, it is clear that the inventive concept(s) disclosed herein is well adapted to carry out the objects and to attain the advantages mentioned herein as well as those inherent in the inventive concept disclosed herein. While exemplary embodiments of the inventive concept disclosed herein have been described for purposes of this disclosure, it will be understood that numerous changes may be made which will readily suggest themselves to those skilled in the art and which are accomplished without departing from the scope of the inventive concept disclosed herein and defined by the appended claims.

The following is a list of non-limiting illustrative embodiments of the inventive concepts disclosed herein:

An illustrative microfluidic device, comprising:
a first substrate having a first side, a second side opposite the first side, and an opening extending through the first substrate from the first side to the second side;
a resilient diaphragm secured to the second side of the first substrate to surround the opening of the first substrate;
an actuator secured to the first side of the first substrate to as to surround the opening of the first substrate, the first substrate, the resilient diaphragm, and the actuator cooperating to form a gas-tight chamber; and
a second substrate having a first side, a second side opposite the first side, and a channel formed in the second side, the channel having a first end and a second end, the second substrate secured to the first substrate so the second side of the first substrate and the second side of the second substrate are in face-to-face contact and a least a portion of the resilient diaphragm positioned between the first end of the channel and the second end of the channel,
wherein a volume of gas is disposable in the gas-tight chamber to pressurize the gas-tight chamber and expand the resilient diaphragm so at least a portion of the resilient diaphragm is disposed in the channel between the first end and the second in a way to form a fluid-tight seal between the first end of the channel and the second end of the channel, and
wherein upon the gas-tight chamber being depressurized, the resilient diaphragm is retractable from the channel to open the channel from the first end and the second end.

The illustrative microfluidic device wherein the volume of gas is disposed in the gas-tight chamber to pressurize the gas-tight chamber and expand the resilient diaphragm so at least a portion of the resilient diaphragm is disposed in the channel between the first end and the second in a way to form a fluid-tight seal between the first end of the channel and the second end of the channel.

The illustrative microfluidic device wherein the resilient diaphragm comprises at least one layer of gas impervious material.

The illustrative microfluidic device wherein the gas impervious material is aluminum.

The illustrative microfluidic device wherein the second substrate has a coefficient of friction, and wherein the resilient diaphragm comprises an outer layer having a coefficient of friction greater than the coefficient of friction of the second substrate.

The illustrative microfluidic device wherein the outer layer of the resilient diaphragm is a polymeric material.

The illustrative microfluidic device wherein the resilient diaphragm comprises:
at least one inner layer of gas impervious material;
at least one outer layer of polymeric material; and
at least one layer of plastic interposed between the inner layer and the outer layer.

The illustrative microfluidic device wherein the actuator comprises at least one layer of gas impervious material.

The illustrative microfluidic device wherein the gas impervious material is aluminum.

The illustrative microfluidic device further comprising a reagent disposed in the channel at the first end thereof.

The illustrative microfluidic device wherein the first layer has a sample receiving reservoir in fluid communication with the second end of the channel.

The illustrative microfluidic device wherein each of the first layer and the second layer has a spindle receiving opening aligned with one another.

An illustrative method of forming a microfluidic device, comprising:
obtaining a first substrate having a first side, a second side opposite the first side, and an opening extending through the first substrate from the first side to the second side;
securing a resilient diaphragm to the second side of the first substrate to surround the opening of the first substrate;
securing an actuator to the first side of the first substrate to surround the opening of the first substrate and so the first substrate, the resilient diaphragm, and the actuator cooperate to form a gas-tight chamber;
obtaining a second substrate having a first side, a second side opposite the first side, and a channel formed in the second side, the channel having a first end and a second end;
securing the second substrate to the first substrate so the second side of the first substrate and the second side of the second substrate are in face-to-face contact and a least a portion of the resilient diaphragm is positioned between the first end of the channel and the second end of the channel; and
pressurizing the gas-tight chamber to expand the resilient diaphragm so at least a portion of the resilient diaphragm is disposed in the channel between the first end and the second to form a fluid-tight seal between the first end of the channel and the second end of the channel.

The illustrative method further comprising disposing a reagent in the channel of the second substrate at the first end thereof.

An illustrative method of controlling fluid flow through a microfluidic device comprising:
depressurizing the gas-tight chamber to cause the resilient diaphragm to retract from the channel to open the channel from the first end and the second end.

The illustrative method wherein the step of depressurizing the gas-tight chamber comprises rupturing the actuator.

What is claimed is:

1. A microfluidic device, comprising:
a first substrate having a first side, a second side opposite the first side, and an opening extending through the first substrate from the first side to the second side;
a resilient diaphragm secured to the second side of the first substrate to surround the opening of the first substrate;
an actuator secured to the first side of the first substrate as to surround the opening of the first substrate, the first substrate, the resilient diaphragm, and the actuator cooperating to form a gas-tight chamber;
a second substrate having a first side, a second side opposite the first side, and a channel formed in the second side, the channel having a first end and a second end, the second substrate secured to the first substrate so the second side of the first substrate and the second side of the second substrate are in face-to-face contact and at least a portion of the resilient diaphragm positioned between the first end of the channel and the second end of the channel; and
a volume of gas disposed in the gas-tight chamber to pressurize the gas-tight chamber and expand the resilient diaphragm so at least a portion of the resilient diaphragm is disposed in the channel between the first end and the second in a way to form a fluid-tight seal between the first end of the channel and the second end of the channel, wherein upon the gas-tight chamber being depressurized, the resilient diaphragm is retractable from the channel to open the channel from the first end and the second end.

2. The microfluidic device of claim 1, wherein the resilient diaphragm comprises at least one layer of gas impervious material.

3. The microfluidic device of claim 2, wherein the gas impervious material is aluminum.

4. The microfluidic device of claim 2, wherein the second substrate has a coefficient of friction, and wherein the resilient diaphragm comprises an outer layer having a coefficient of friction greater than the coefficient of friction of the second substrate.

5. The microfluidic device of claim 2, wherein the outer layer of the resilient diaphragm is a polymeric material.

6. The microfluidic device of claim 1, wherein the resilient diaphragm comprises:
at least one inner layer of gas impervious material;
at least one outer layer of polymeric material; and
at least one layer of plastic interposed between the inner layer and the outer layer.

7. The microfluidic device of claim 1, wherein the actuator comprises at least one layer of gas impervious material.

8. The microfluidic device of claim 7, wherein the gas impervious material is aluminum.

9. The assay cartridge of claim 1 further comprising a reagent disposed in the channel at the first end thereof.

10. The microfluidic device of claim 8, wherein the first layer has a sample receiving reservoir in fluid communication with the second end of the channel.

11. The microfluidic device of claim 10, wherein each of the first layer and the second layer has a spindle receiving opening aligned with one another.

12. A microfluidic device, comprising:
a first substrate having a first side, a second side opposite the first side, and an opening extending through the first substrate from the first side to the second side;
a resilient diaphragm secured to the second side of the first substrate to surround the opening of the first substrate;
an actuator secured to the first side of the first substrate as to surround the opening of the first substrate, the first substrate, the resilient diaphragm, and the actuator cooperating to form a gas-tight chamber; and
a second substrate having a first side, a second side opposite the first side, and a channel formed in the second side, the channel having a first end and a second end, the second substrate secured to the first substrate so the second side of the first substrate and the second side of the second substrate are in face-to-face contact and at least a portion of the resilient diaphragm positioned between the first end of the channel and the second end of the channel, wherein a volume of gas is disposable in the gas-tight chamber to pressurize the gas-tight chamber and expand the resilient diaphragm so at least a portion of the resilient diaphragm is disposed in the channel between the first end and the second in a way to form a fluid-tight seal between the first end of the channel and the second end of the channel, and wherein upon the gas-tight chamber being depressurized, the resilient diaphragm is retractable from the channel to open the channel from the first end and the second end.

13. The microfluidic device of claim 12, wherein the resilient diaphragm comprises at least one layer of gas impervious material.

14. The microfluidic device of claim 13, wherein the gas impervious material is aluminum.

15. The microfluidic device of claim 13, wherein the second substrate has a coefficient of friction, and wherein the resilient diaphragm comprises an outer layer having a coefficient of friction greater than the coefficient of friction of the second substrate.

16. The microfluidic device of claim 13, wherein the outer layer of the resilient diaphragm is a polymeric material.

17. The microfluidic device of claim 12, wherein the resilient diaphragm comprises:
at least one inner layer of gas impervious material;
at least one outer layer of polymeric material; and
at least one layer of plastic interposed between the inner layer and the outer layer.

18. The microfluidic device of claim 12, wherein the actuator comprises at least one layer of gas impervious material.

19. The microfluidic device of claim 18, wherein the gas impervious material is aluminum.

20. The assay cartridge of claim 12 further comprising a reagent disposed in the channel at the first end thereof.

21. The microfluidic device of claim 19, wherein the first layer has a sample receiving reservoir in fluid communication with the second end of the channel.

22. The microfluidic device of claim 21, wherein each of the first layer and the second layer has a spindle receiving opening aligned with one another.

23. A method of forming a microfluidic device, comprising:
obtaining a first substrate having a first side, a second side opposite the first side, and an opening extending through the first substrate from the first side to the second side;
securing a resilient diaphragm to the second side of the first substrate to surround the opening of the first substrate;
securing an actuator to the first side of the first substrate to surround the opening of the first substrate and so the first substrate, the resilient diaphragm, and the actuator cooperate to form a gas-tight chamber;
obtaining a second substrate having a first side, a second side opposite the first side, and a channel formed in the second side, the channel having a first end and a second end;
securing the second substrate to the first substrate so the second side of the first substrate and the first side of the second substrate are in face-to-face contact and a least a portion of the resilient diaphragm is positioned between the first end of the channel and the second end of the channel; and
pressurizing the gas-tight chamber to expand the resilient diaphragm so at least a portion of the resilient diaphragm is disposed in the channel between the first end and the second to form a fluid-tight seal between the first end of the channel and the second end of the channel.

24. The method of claim 23, further comprising disposing a reagent in the channel of the second substrate at the first end thereof.

25. A method of controlling fluid flow through a microfluidic device according to claim 1, the method comprising:

depressurizing the gas-tight chamber to cause the resilient diaphragm to retract from the channel to open the channel from the first end and the second end.

26. The method of claim 25, wherein the step of depressurizing the gas-tight chamber comprises rupturing the actuator.

\* \* \* \* \*